United States Patent
Flack et al.

(10) Patent No.: US 12,225,079 B2
(45) Date of Patent: Feb. 11, 2025

(54) ENSURING COHERENCY ACROSS RESPONSES WHEN HANDLING A SERIES OF CLIENT REQUESTS

(71) Applicant: Akamai Technologies, Inc., Cambridge, MA (US)

(72) Inventors: Martin Flack, Denver, CO (US); Stephen Ludin, Mill Valley, CA (US); Michael Bishop, Cincinnati, OH (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 18/146,340

(22) Filed: Dec. 23, 2022

(65) Prior Publication Data
US 2024/0214449 A1    Jun. 27, 2024

(51) Int. Cl.
| | |
|---|---|
| *H04L 67/1025* | (2022.01) |
| *H04L 67/02* | (2022.01) |
| *H04L 67/1001* | (2022.01) |
| *H04L 67/1012* | (2022.01) |
| *G06F 12/0815* | (2016.01) |
| *H04L 9/40* | (2022.01) |
| *H04L 67/1029* | (2022.01) |

(52) U.S. Cl.
CPC .......... *H04L 67/1025* (2013.01); *H04L 67/02* (2013.01); *H04L 67/1001* (2022.05); *H04L 67/1012* (2013.01); *G06F 12/0815* (2013.01); *H04L 63/10* (2013.01); *H04L 67/1029* (2013.01)

(58) Field of Classification Search
None
See application file for complete search history.

(56) References Cited

U.S. PATENT DOCUMENTS

| | | | |
|---|---|---|---|
| 6,219,676 B1 * | 4/2001 | Reiner | H04L 67/5682 709/224 |
| 6,820,133 B1 | 11/2004 | Grove et al. | |
| 7,020,719 B1 | 3/2006 | Grove et al. | |
| 7,328,222 B2 * | 2/2008 | Keith | G06F 12/0831 |

(Continued)

FOREIGN PATENT DOCUMENTS

CN          103781079 A          5/2014

OTHER PUBLICATIONS

Toomin, M. et al., "Braid-HTTP: Synchronization for HTTP draft-toomim-httpbis-braid-http-02", Mar. 9, 2020, available at https://datatracker.ietf.org/doc/draft-toomim-httpbis-braid-http/02/.

(Continued)

*Primary Examiner* — Lashonda Jacobs-Burton

(57) ABSTRACT

It is often important that a server's responses to a set of client requests are coherent with one another, but if the client's requests are spread over time, that may not occur. In accordance with the teaching of this patent document, a client is able to communicate with a server to achieve coherency. A client can send a request (e.g., an HTTP request for a given resource) with a data preservation directive. The data preservation directive causes the server to initiate a server-side process to preserve the state of underlying server-side data upon which the response relies (or will rely). Also, a client can send a request with an attribute requesting the response be coherent with respect to some date-time or other reference point. This attribute thus asks the server to ensure coherency in the response to the client.

15 Claims, 5 Drawing Sheets

(56) References Cited

U.S. PATENT DOCUMENTS

| | | | |
|---|---|---|---|
| 7,607,062 B2 | 10/2009 | Grove et al. | |
| 7,764,622 B2 | 7/2010 | El-Damhougy et al. | |
| 8,019,447 B2 | 9/2011 | Hoisington et al. | |
| 8,019,811 B1* | 9/2011 | Britto | G06F 3/0482 |
| | | | 709/226 |
| 8,176,097 B2* | 5/2012 | Andersen | G06F 16/9038 |
| | | | 707/805 |
| 8,189,496 B2 | 5/2012 | Wittenschlaeger | |
| 8,458,727 B2* | 6/2013 | Palmer | G06F 16/972 |
| | | | 719/318 |
| 8,635,271 B1* | 1/2014 | Adya | H04L 67/5683 |
| | | | 709/217 |
| 8,868,846 B2* | 10/2014 | Ober | H04L 67/568 |
| | | | 711/141 |
| 9,385,914 B1* | 7/2016 | Britto | H04L 67/568 |
| 10,419,106 B1 | 9/2019 | Liu et al. | |
| 11,122,140 B1* | 9/2021 | Britto | G06F 3/0482 |
| 11,171,720 B1 | 11/2021 | Uthaman et al. | |
| 2001/0013070 A1* | 8/2001 | Sasaki | H04L 67/04 |
| | | | 709/249 |
| 2002/0002603 A1* | 1/2002 | Vange | H04L 67/303 |
| | | | 709/219 |
| 2003/0217081 A1* | 11/2003 | White | G06F 12/0813 |
| | | | 707/999.203 |
| 2007/0180113 A1* | 8/2007 | Van Bemmel | H04L 67/1001 |
| | | | 709/226 |
| 2008/0307037 A1* | 12/2008 | Zhang | H04L 69/163 |
| | | | 709/203 |
| 2015/0331794 A1* | 11/2015 | Ren | G06F 12/128 |
| | | | 709/214 |
| 2017/0230442 A1* | 8/2017 | Denoual | H04L 47/70 |
| 2019/0182349 A1* | 6/2019 | Goel | H04L 67/55 |

OTHER PUBLICATIONS

Toomin, M. et al., "Braid-HTTP: Synchronization for HTTP draft-toomim-httpbis-braid-http-04", available at https://raw.githubusercontent.com/braid-org/braid-spec/master/draft-toomim-httpbis-braid-http-04.txt (downloaded Nov. 15, 2023, dated Oct. 23, 2023).
"Create a Database Snapshot (Transact-SQL), Nov. 18, 2022, 5 pages.", downloaded on Dec. 19, 2022.
"Machine Translation of CN103781079A, Espacenet", 12 pages, May 7, 2014. 29 pages.
"Machine Translation of CN103781079A, Google Patents" 12 pages, May 7, 2014.
"RFC 9000 QUIC: A UDP-Based Multiplexed and Secure Transport, May 2021, 151 pages."
Berners-Lee, et al., "RFC 1945, Hypertext Transfer Protocol—HTTP/1.0, May 1996, 61 pages.".

* cited by examiner

ENSURING COHERENCY ACROSS RESPONSES WHEN HANDLING A SERIES OF CLIENT REQUESTS

BACKGROUND

Technical Field

This patent document generally relates to computer networking and more particularly to network communication where server-side data changes quickly relative to the rate of a client's requests.

Brief Description of the Related Art

The client-server request-response model is a dominant paradigm for network communications today. The HTTP protocol, for example, defines a set of request message formats and methods, as well as response message formats and codes. They are in wide use.

In computer networking, a client may make several requests to a server as part of a logical session. Various techniques have been developed to provide session persistence, i.e., to ensure that the client consistently interacts with the same server during a given session.

A problem can arise, however, when server-side data changes quickly relative to the rate at which a client's requests are received and/or processed. That might be the case in very high latency network communication systems, such as interplanetary communication or spacecraft communication, where round trip time may be on the order of minutes or hours. It also might occur, for example, due to client device limitations, network congestion, or high server load.

Such situations present numerous challenges. The notion of a 'session' as currently used, may be impractical or impossible to implement. Furthermore, even if a client persistently returned to the same server instance in the same "session", there are currently no suitable mechanisms to ensure that the server will use the same set of server-side data to generate responses to a client's requests. Yet seconds or minutes may pass between such requests—ample time for relevant back-end information to be updated, overwritten, invalidated, or the like.

In some embodiments, the teachings disclosed in this patent document enable a mode of network communication that facilitates improved data coherency across server responses, and they enable a client to enforce and/or take advantage of such data coherency.

In some embodiments, the teachings hereof can be used when a client and a server are separated by such a long latency that across requests the client is at risk of retrieving resources that correspond to different versions of the base web page, or different versions of the base API request, or may fail to be able to request those resources because they have been removed from service or expired.

In some embodiments, the teachings hereof can be used when server-side data is changing on a fast-paced schedule, the client-server latency is moderate, and the client is in need of requesting a coherent and congruent set of resources that works together.

In some embodiments, the teachings hereof can be used to make backups, e.g., over HTTP or otherwise, in situations where best practice in any backup methodology is generally to work from a snapshot rather than a live, changing, set of data.

In some embodiments, the teachings hereof can be used to access massive data sets provided by vendors or intelligence suppliers, particularly where a mutually-consistent relationship between resources is beneficial from the first to last request, but it is unclear from the outset how much of the data will be accessed during that operation.

Generalizing, the teachings hereof improve the functioning of networks and computer systems including client devices, servers, and internet infrastructure. Those skilled in the art will understand these and other improvements upon reviewing the remainder of the document.

BRIEF SUMMARY

This section describes some pertinent aspects of this invention. Those aspects are illustrative, not exhaustive, and they are not a definition of the invention. The claims of any issued patent define the scope of protection.

It is often important that a server's responses to a set of client requests are coherent with respect to one another, but if the client's requests are spread over time, that may not occur. For example, if client to server round trip time is high, relative to the rate at which data changes on the server side, there is a risk that relevant server-side data may change between requests, leading to incoherent responses. Second, a client may be incapable of issuing requests in rapid sequence, due to communication problems (such as a noisy wireless environment), client processing limitations, intermediate network congestion, or limited power. Third, there may be a bottleneck on the server side, e.g., the server may be under heavy load, or the size of the response to an initial client request may be large enough to tie up server and network link resources for a significant amount of time. In the extreme, those circumstances may significantly delay the processing of a subsequent client request; ensuring coherency across responses may be important in such situations. For example, if a client sends a large request, such as a complex GraphQL query, the server should ensure that the request is processed against the same state from beginning to end. If a server has a large response to serve to a client, a significant amount of time might pass between the transmission of the first bytes and last bytes of a response; ensuring coherency between the first bytes served and the last bytes served can be important in such situations. Fourth, the requested content itself may be inherently time-dependent. For example, imagine a request for a dynamically generated page that lists, as of the request, the last N articles published on a particular topic, with links to pages that list earlier articles in groups of N (e.g., ten articles on each page). The content on the initial page will necessarily change as new articles are published. A client requesting the first page and then the second page may see incoherent results if new articles are published in between those requests.

In accordance with the teaching of this patent document, a client is able to communicate with a server to ensure that it receives coherent responses. A client can send a request (e.g., an HTTP request for a specified resource) that includes a data preservation directive. A data preservation directive may be explicit, such as a header field, or implicit. It may specify a date-time or an event at which data preservation is requested to occur, or if nothing is specified, the time of preservation may be implicitly understood as the date-time at which the directive was received or some other time or event.

The data preservation directive causes the server to initiate a server-side process to preserve the state of the underlying server-side data upon which the response relies, or upon which a response to a future request will rely. This typically means that the values of server-side data are captured and indexed according to some kind of versioning or checkpointing scheme. The scope of server-side data that is captured may vary widely depending on implementation. It could be a specific web resource, all of the resources mentioned in connection with a given page or pages, or resources under a given domain, subdomain, or path. Or, the server-side data could be data that is processed, aggregated, or otherwise used to produce a response to the client's request. Generally speaking, if the response is a result of calculation, algorithm, or formula on the server-side, then it may be necessary to preserve the underlying data inputs to such calculation, algorithm, or formula (or the cached results, or partial results, thereof), as well as the algorithm, formula, or calculation instructions themselves.

Further, given the initial request, it may be possible to predict future requests, and preserve current underlying data related to those predicted requests, as well.

Such server-side data is typically held in various databases, file stores, or generated by server-side services, that collectively form the "back-end" infrastructure of a website, web application, API, or other service. Hence, upon receipt of a data preservation directive, the server (the "front-end") can initiate a process to snapshot the relevant underlying data in the back-end via various forms of communication.

Also, a client can send a request with a 'make-response-coherent-' attribute. In other words, this request attribute asks the server to provide a response based on a particular set of server-side data, thus ensuring it is coherent. In other embodiments, a client can qualify the 'As-Of' attribute by specifying which set of server-side data that should be used by the server to generate a response. Typically, the 'As-Of' attribute would specify a time-stamp or version identifier. In HTTP, the 'As-Of' attribute would typically be implemented as header fields, or combined into one header field.

In alternative embodiments, the 'As-Of' attribute does not specify a particular date-time or version, but rather the client and server have some mutual understanding about how the coherency should be achieved. For example, if the request is part of a particular client session, then a server might assume that it should use the version of server-side data corresponding to when the initial request was received. That approach requires the server to maintain such a state.

Preferably, the client and server negotiate the meaning of the 'As-Of' attribute. For example, in response to an initial client request with a data preservation directive, the server may respond with a tag (e.g., a server-side date-time stamp or version id) identifying what it captured. The client then uses that value as a handle to specify the same set of server-side data in future requests. Preferably, a server is able to process and honor multiple concurrent preservation directives (whether from the same or different clients).

In some embodiments, a client may ask the server to provide a manifest of the available versions of responses and/or server-side data. A server that periodically takes snapshots of server-side data (that is, regardless of client requests to do so) then provides a list of recent snapshots. The client can use this information to decide which set of server-side data to ask for, again using the 'As-Of' attribute.

As should be evident from the foregoing discussion, the client sending a data-preservation directive might be different from the client that sends an 'As-Of' attribute. Any client can take advantage of the coherency features provided by the server by making its requests for the same set of underlying server-side data. Indeed, as mentioned, in some embodiments a data preservation directive may not be needed at all, if the server simply captures periodic snapshots and exposes that information to clients.

The claims are incorporated by reference into this section, in their entirety.

BRIEF DESCRIPTION OF THE DRAWINGS

The invention will be more fully understood from the following detailed description taken in conjunction with the accompanying drawings, in which.

Numerical labels are provided in some FIGURES solely to assist in identifying elements being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The things described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies including HyperText Transfer Protocol (HTTP) versions 1.1, 2 and 3 is assumed. Likewise, it is assumed there is basic familiarity with well-known database technologies and terms, such as relational databases (RDBMS), SQL databases and queries, NoSQL databases and/or key-value approaches, and filesystems (e.g., "copy-on-write filesystem" or "filesystems and logical volume managers such as zfs, btrfs, lvm2).

All references to HTTP should be interpreted to include an embodiment using encryption (HTTP/S), such as when TLS secured connections are established. While context may indicate the hardware or the software exclusively, should such distinction be appropriate, the teachings hereof can be implemented in any combination of hardware and software. Hardware may be actual or virtualized.

Protocol Enhancements

Figure 1:
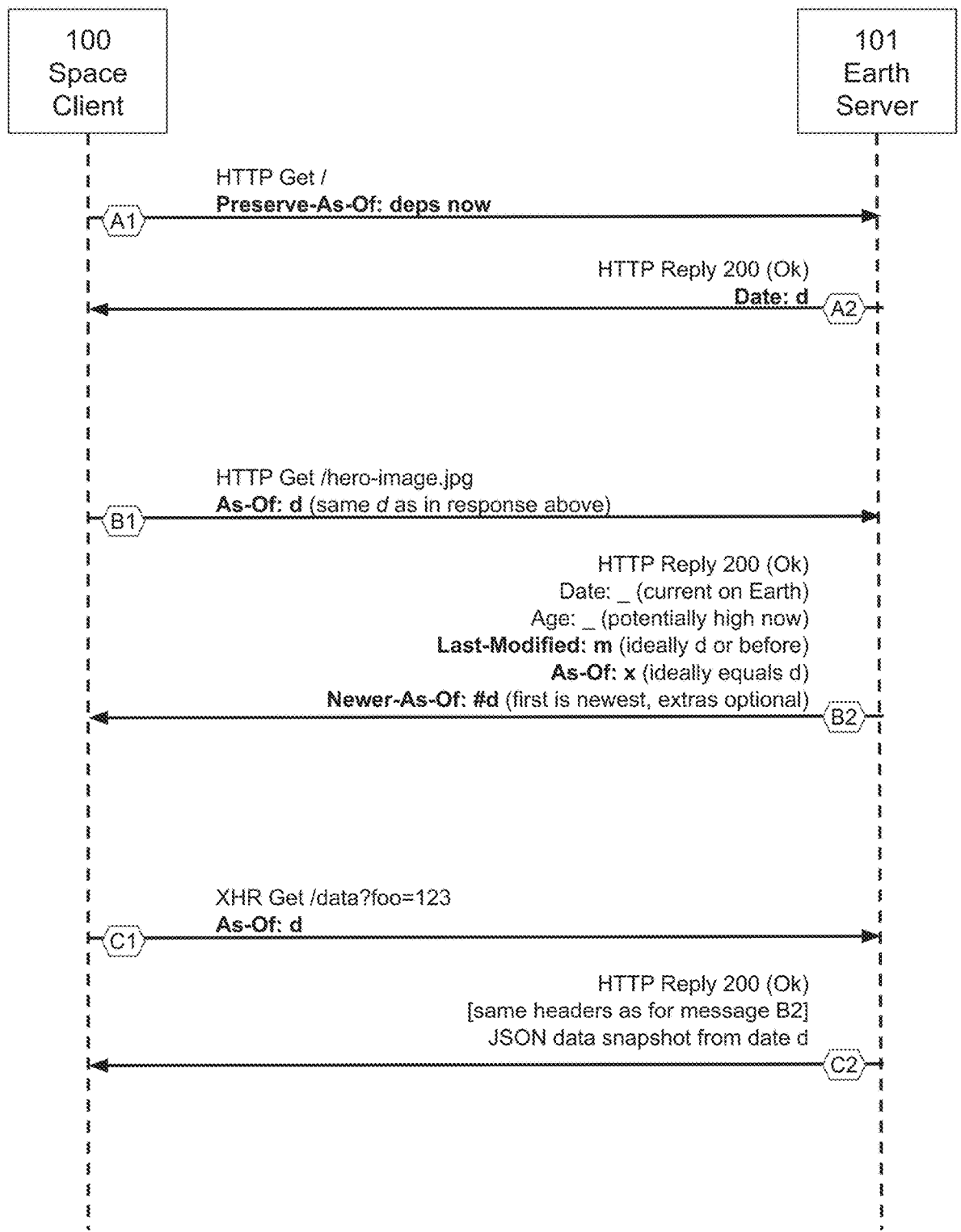
FIG. 1 is a diagram illustrating a set of exemplary message exchanges, in accordance with one embodiment of the teachings hereof.

FIG. 1 is a sequence diagram illustrating exemplary message exchanges between a "Space Client" 100 and an "Earth Server" 101. The message exchanges are labeled as A, B, C with individual messages indicated by a trailing number, e.g., A1, A2. The label "Space Client" is used as an example, here a web client located in outer space with a high latency to earth. "Earth Server" is used as an example, and in this example means a web server or server infrastructure that is on or orbiting planet Earth. However, the server could also be at another space-based location. The point is that the client and server are very far apart in distance, such that latency is measured in minutes. Message semantics in FIG. 1 and the accompanying description, below, are presented as an enhancement to HTTP protocol; however, the HTTP protocol is not a limitation of the teachings hereof.

Figure 2:
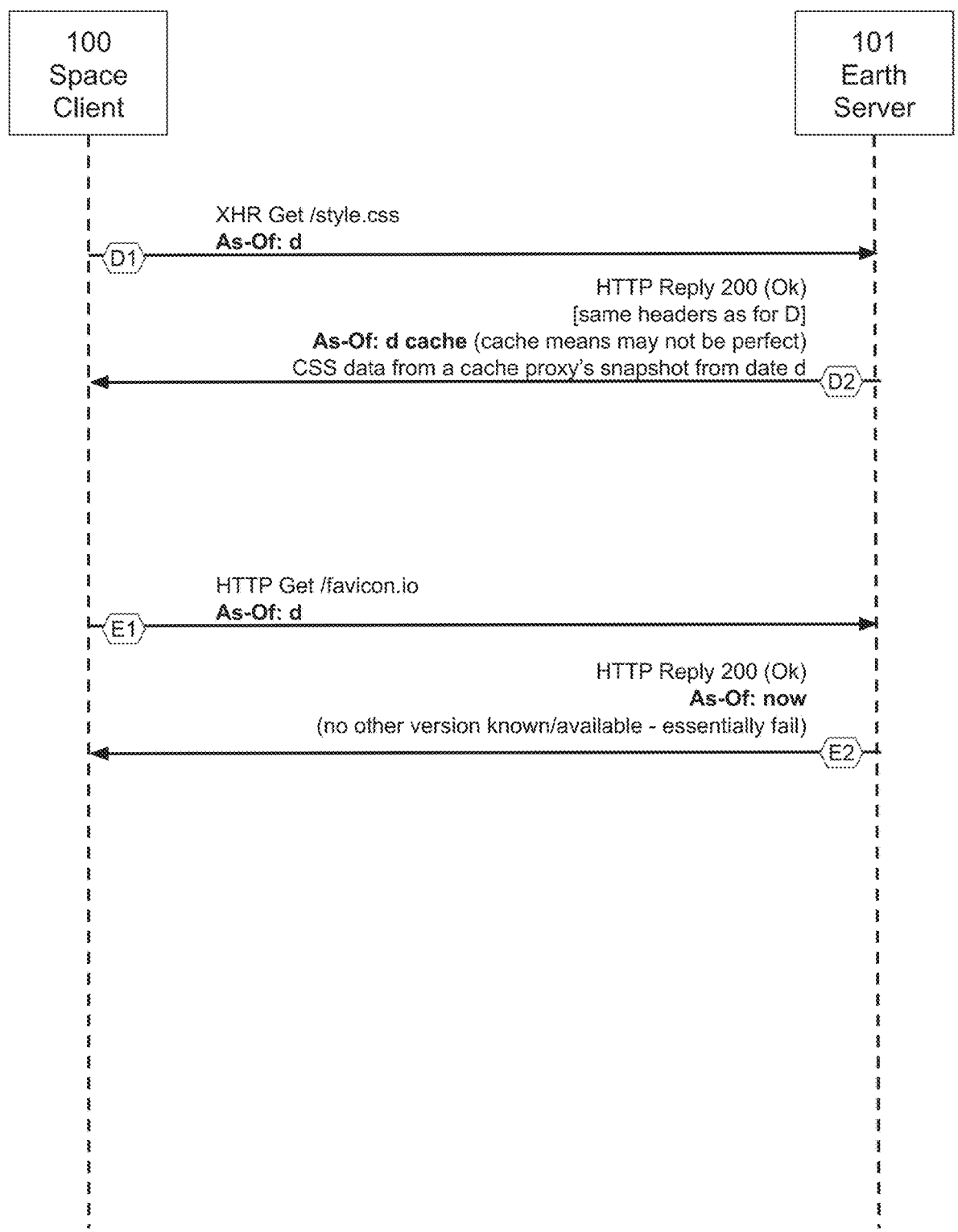
FIG. 2 is a diagram illustrating another set of exemplary message exchanges, in accordance with one embodiment of the teachings hereof.

FIG. 2 is a sequence diagram illustrating additional sets of exemplary message exchanges, labeled D and E, between the space client 100 and earth server 101.

Illustrative embodiments of the message exchanges and new headers are now described. Preferably, references to date-times in the following messages are expressed by the devices in a format specified by an IETF RFC for HTTP date-times, such as RFC 9110. Also, reference to 'timestamps' in this document refers to a date-time in such format, unless otherwise specified or clear from context.

Message exchange A1/A2 illustrates the use of the Preserve-As-Of header, shown below, which is an example of a data preservation directive issued by the client. (Because this embodiment is using HTTP, the directive is implemented as an HTTP header field.)

Preserve-As-Of: [deps|site|pages] now [tolerance] [time-to-preserve]

The Preserve-As-Of header is a header that a client can transmit to indicate an interest in accessing a resource (e.g., whether a web object, other content, a responsive signal, an API response, or otherwise) and an interest in being able to access that resource at another date-time. The keywords 'deps', 'site', and 'pages', which are shown in a bracket separated by pipe characters, are alternative options. The keyword 'deps' means dependencies of the current request, e.g. requesting the home page (path '/') with this header would indicate that the server is being asked to preserve dependencies of this home page, including all assets commonly requested soon after the home page, at least including resources literally referenced in the home page, but preferably including expected programmatically-derived requests, and including requests that commonly result from some user interaction, to the extent possible (and possibly listed with the help of technology that conducted prior analysis). The keyword 'pages' refers to pagination of a long list of results, so for example, fetching the first "page" of 50 results in a list that is thousands long could be accompanied by this header to request a simultaneous capture of the remaining pages, thus making them eventually and optionally retrievable as a consistent set. The keyword 'site' means all URIs on the same hostname; the client is asking for a complete copy of the website/API to be preserved.

The keyword 'now' means the date-time that the server receives the request. The server should, if possible, make arrangements to preserve data on the server side. Further details of that preservation process are described below in connection with FIG. 3. In some applications, clients could accept data as of a past time, or future time. Along those lines, the keyword 'tolerance' is a positive integer of seconds that defines a window in time backwards from "now" (meaning the moment received by server), e.g., '1800' means the client could tolerate a snapshot that was up to half an hour old. If omitted, tolerance defaults to 86400. A server preferably supports the 'tolerance' functionality by making regular snapshots; a server would thus fulfill a request using the latest snapshot within the tolerance window instead of creating one especially for the requesting client.

In message A2, the server responds with a HTTP 200 ok and a header field indicating a Date specifying date-time d. That date-time d represents the point in time at which the server has preserved server-side data. It may indicate the date-time at which the client's request was received, if the server was able and willing to preserve server-side data at that date-time. If the server was unable or unwilling to do so, it may correspond to a different date-time (such as a version of data preserved recently in response to another client request, or due to a scheduled process).

In some embodiments, the server supplements message A2 with a flag or separate header field indicating a duration—that is, how long the server is able and willing to retain the server-side data that it preserved for the client. The duration may be expressed as a value relative to the date-time of d, for example a value of N seconds means the data will be retained for N seconds after d. After the duration expires, the server might delete the data for storage management or other purposes. Note that a client may request (in message A1) that the server retain the data for a given period of time; in that case, the message A2 either matches the client's request (accepting it) or provides another duration (rejecting it).

As-Of: [d|now|tag/t] [cache]

The use of the above header is illustrated by message exchange B1/B2 in FIG. 1. This is an example of an 'As-Of' request attribute specifying an 'as-of' with a date-time. (Because this embodiment is using HTTP, the attribute is implemented as an HTTP header field.)

As a client request header, the 'As-Of' header requests that the server provide the resource that, in the past, was responsive to the request, as of the given date-time d, not as of now. This would ideally be pursuant to an earlier request for a related resource carrying a 'Preserve-As-Of' header. If a client makes a request and wants date arithmetic done (e.g., "I want the data as of one hour before this date-time value"), preferably it doesn't do the arithmetic but rather sends back 'As-Of:d[+/−]x' where x is integer seconds and has a plus or minus in front. This can be ignored by the server, or rounded off, or honored precisely, but the server's 'As-Of' header back again will provide this information.

As a server response header, this indicates a date-time for which the resource was responsive, and ideally exactly matches d from an earlier 'Date' (message A2). Note that while a standard 'Last-Modified' header may imply that the preserved resource was presented, this header can confirm that the request was understood and considered.

If the keyword 'now' is provided instead of a date-time, that indicates that the server is not capable of providing this resource as of any earlier point in time. Generally, it would not make sense to respond with a Last-Modified that predates d concomitantly with 'As-Of: now' but that is valid and indicates that the server is unaware whether there were intervening versions later than the Last-Modified date-time but earlier than d. The use of this keyword is illustrated in FIG. 2, message exchange E1/E2.

In an alternative embodiment, the server may provide a unique 'tag' t rather than a date-time value, which will be prefixed with the keyword 'tag' and a forward slash in order to simply disambiguate from any type of date-time parsing. The tag is a server-chosen value, possibly opaque, that is simply a label for the version of the data that the client is receiving back. The client may thereafter use that tag as a handle to request other data associated with the same version.

As shown in message D2 (FIG. 2), the server may also append the keyword 'cache' which indicates that the resource was not accessed through a system that positively retains each version ever made or each version notified by 'Preserve-As-Of', but rather a proxy-like system that opportunistically saves versions as they pass through it, and thus may hypothetically not be the version that would've been served had a request actually been made at time d.

Newer-As-Of: #d
The use of this header is illustrated by B2 in FIG. 1. This is a server response header that indicates that while the resource served is responsive for the 'As-Of' request, there are versions of the resource that are currently accessible and known to be newer than the version served. These are date-time values that indicate the Last-Modified header that would correspond to each version. The server may choose, for efficiency, to limit the number of versions offered this way, or only mention the newest version. Multiple date-time values can be combined in the header with commas per RFC 9110. A subsequent client request with an 'As-Of' equal to one of these date-time's should return a resource that is hypothetically different from the version in the current payload.

Message exchange C illustrates the use of the 'As-Of' header in conjunction with an XMLHTTPRequest (AJAX request fired by Javascript) for a given piece of data—in this case a JSON formatted response.

Moving to FIG. 2, message exchange D illustrates an AJAX style call to a server to fetch a style sheet. The server responds with a 'cache' attribute indicating the returned style sheet is a copy made by the proxy at a given date/time.

Message exchange E illustrates a 'Get' request for a resource that draws a server response 'As-of: now', which was explained above.

Handling a 'Preserve-As-Of' Header in a Request

Figure 3:
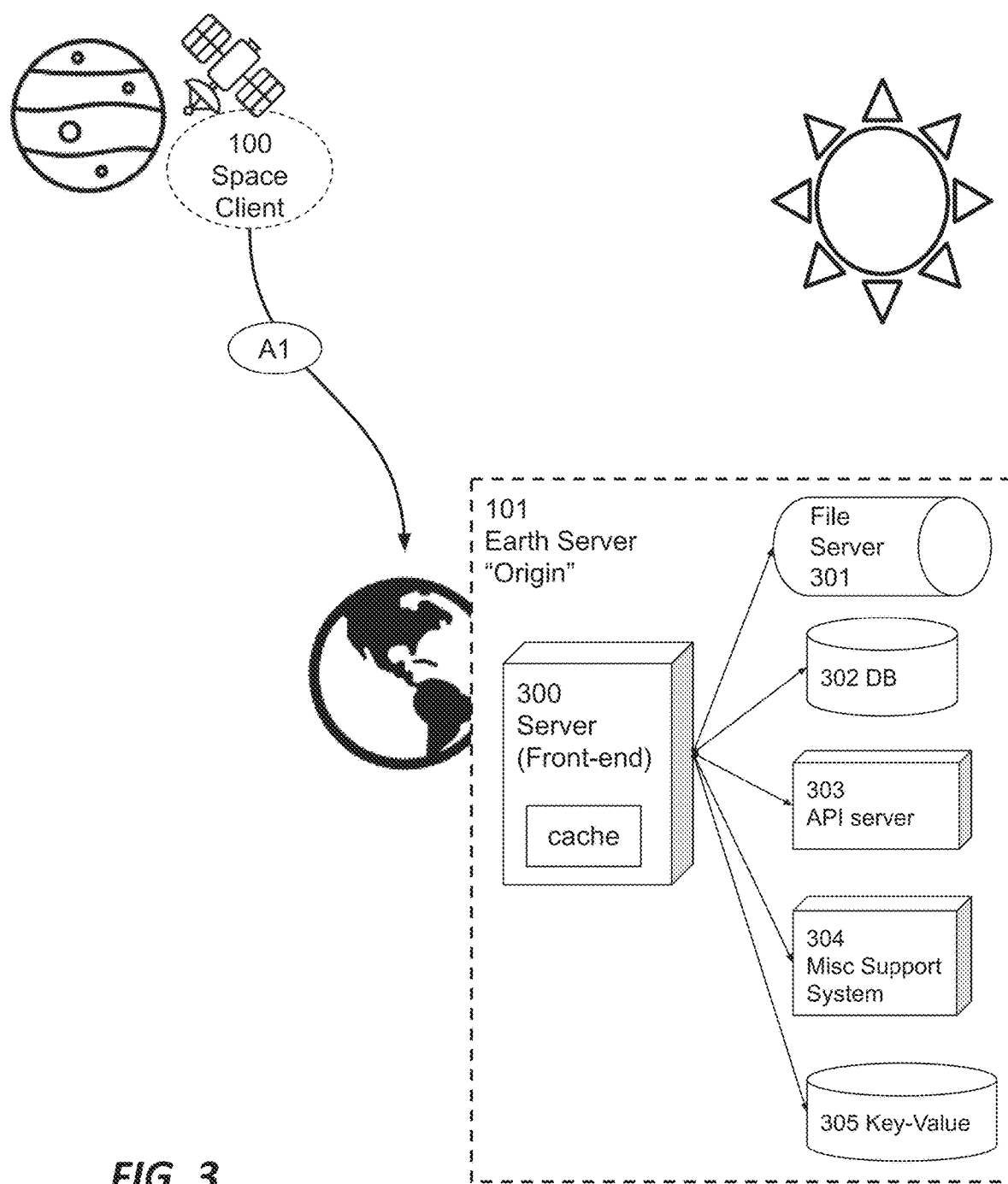
FIG. 3 is a diagram illustrating the preserve or 'snapshot' operation orchestrated by a front end server, in accordance with one embodiment of the teachings hereof.

This section describes how a data preservation directive (e.g., the Preserve-as-Of header) is handled at the server infrastructure, at least in some embodiments. FIG. 3 illustrates the general situation in which a space client 100 sends a request (in this example, message A1 from FIG. 1) to the Earth Server 101. As shown in FIG. 3 the Earth Server 101 is unpacked to reveal a collection of components forming a server side infrastructure. The A1 message with header would be received in the first instance at server 300, which serves as the "front-end" to the components 301-305, which are referred to collectively as the "back-end". Server 300 may be a web server. In one variant, illustrated in FIG. 4, the server is augmented with a reverse proxy 400 that may perform some of the functions of the web server 300 in the description that follows.

Figure 4:
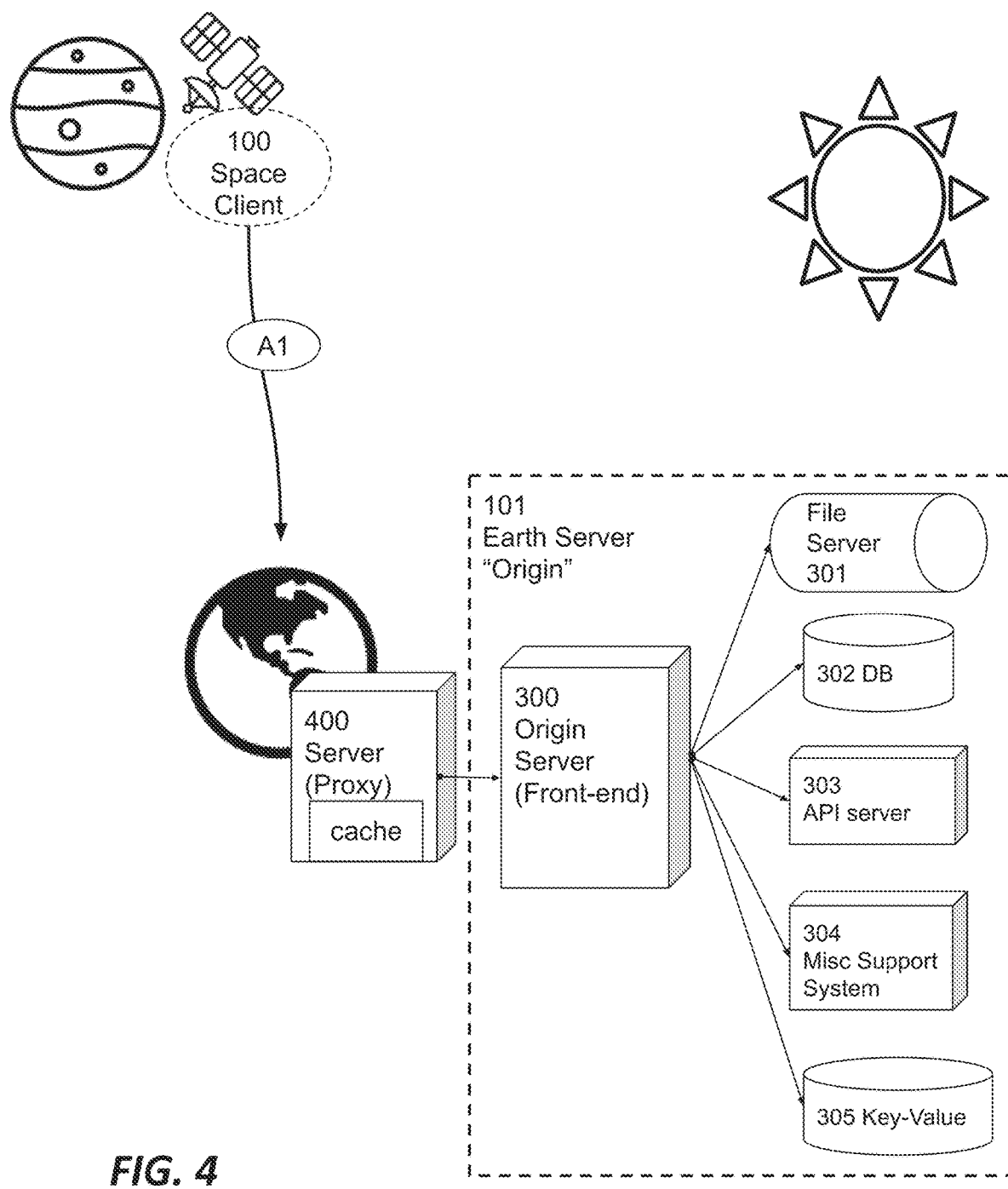
FIG. 4 is similar to FIG. 3 but the server 300 is augmented with a reverse proxy 400, in accordance with one embodiment of the teachings hereof; and, FIG. 5 is a block diagram illustrating hardware in a computer system that may be used to implement the teachings hereof.

The components shown in FIGS. 3 and 4 may be located remotely from one another. Some or all components shown could be integrated into a single data center or machine. The arrows between front-end servers 300/400 and the back-end components represent data transfer as well as a pubs/sub or other control plane mechanism for requesting requests to snapshot/preserve data.

For convenience of description, the description that follows will be referred to as server 300/400, so as to indicate that either FIG. 3 or FIG. 4 arrangement could be deployed, and moreover that the functions allocated to one of 300 and 400 can be moved to the other, depending on design goals.

In one embodiment, the server 300/400 responds to a data preservation directive by publishing or otherwise distributing requests to back-end components to preserve the relevant data they have at the relevant time. Later, if needed, all of those snapshots can be pulled by the server 300/400. Put another way, the signal from a client's "Preserve-As-Of" can trigger a "saving action" which permits the system to provide a static and consistent set of responses to related requests (e.g., dependencies or those identified through a predictive prefetch analysis) or all requests for the site (e.g., a domain) as a whole. An example of a predictive prefetch that could be adapted and used for this purpose is disclosed in US Patent Publication No. 2014/0379840 published Dec. 25, 2014, and titled "PREDICTIVE PREFETCHING OF WEB CONTENT", the contents of which are hereby incorporated by reference.

In some embodiments, the server may prefer to preserve a wide scope of server-side data, which may reduce the frequency at which the server side infrastructure is able to take the snapshots. To accommodate this, the server can take infrequent, periodic snapshots and select the nearest one to identify with the date-time in a response message (A2). This approach is often suitable because the client is more concerned with coherency of the server side data rather than freshness.

The server 300/400 may execute the saving action by passing the signal back to all the constituent subsystems/services/microservices/servers/containers that are logical parts of that origin (even if they are physically distributed). These origin constituents and the web server may employ or use a pub-sub (publish-subscribe) mechanism to do this.

Alternatively, the server 300/400 could pull all of the data by making a request in the regular way, and then cache the results locally. This approach relieves the back-end components of the task and does not require across the board compatibility with the pub/sub/snapshot features.

For example, consider the system illustrated in FIGS. 3 and 4. Upon the server 300/400 receiving a 'Preserve-As-Of' header, the server 300/400 could signal the file server 301 and key-value store 305 with a copy of the header by publishing a message to a pub-sub system, specifically to a channel therein, to which the other components (301, 302, 303, 304, 305) are subscribed and would expect such a message.

The file server 301 could then take advantage of filesystem snapshot technology in the underlying filesystem or operating system; for example, on a Linux or Unix server, on a filesystem using ZFS (also known as Zettabyte File System), Btrfs (also known as B-Tree file system), or LVM2 (Logical Volume Manager), a snapshot can be created that, subject to certain constraints, maintains the current state of the filesystem, even as future changes are made, and allows that snapshot to be mounted and read separately. Alternatively, the files served by the file server 301 may be checked into a version control system, such as Git, and the file server 301 may simply make a database entry noting the current version, e.g. the hash in Git, associating it with the date-time provided in an index; or, relying on the fact that Git history is, broadly speaking, scannable to determine the version that was apparently present at a given date-time, and thus simply by using a single branch of a Git repository to serve files, a file server 301 can check out and serve prior versions.

To further continue the example, the key-value store 305 could use logic to preserve a time-indexed history of values available at each key, even as key-values are created, updated, and removed. Various methodologies can be employed to either maintain a full time-series, or to simply maintain versions when signaled by the system, as described above. In one possible implementation of this, a key entry does not point to a value as normal, but rather to a singly-linked list that stores the most recent value at the front (and builds on the front), and for each value stores more than just the value, but a structure that contains the timestamp it was set, and a special bit or a special value to indicate deletion (which is how a key is deleted, instead of removing it from the index of keys). This data structure would permit the key-value store 305 to return the current value of a key, but given a date-time, also return a previous value current at that time.

In this example, the constituent back-end components have been envisioned as preserving a "full history" such that they are unconcerned at the time of a signal of which pieces of data might be necessary to fetch older versions later. This is one engineering approach, but may require excessive storage capacity. In other embodiments, the system as a whole may take into account more knowledge about how the requested resource (e.g., web content) actually exists and changes, and store versioned copies of only related resources to mentioned timestamps. The trade-off in this case is that comprehensive testing is possibly complicated by needing an entire system in place.

The system may place a lifetime limit on preserved data, e.g., a hard limit based on time, or a soft limit based on an eviction policy designed to dynamically manage to the limits of the hardware made available to the system, or some combination of both.

In another embodiment, the 'Preserve-As-Of' header could carry another field ('time-to-preserve') which indicates for how long the client expects to require access to the data (in the example header format example above, where this value follows an optional tolerance value, both would need to be expressed, as the server identifies the fields by position in the header line). In other words, the time to preserve value indicates for how long the server should keep the data. A client may not always be able to determine an accurate preservation time, because: (a) the client often does not know the size or number of resources required by the end of the load, (b) transmission problems and retries, or re-prioritization or pausing of traffic, over long latencies can cause very long deviations in expected fetching time, and (c) an end-user invoking a Refresh function on a client browser may desire that the refresh uses the same timestamp as before in an 'As-Of' header. However, unless such factors render the prediction impossible, the client can provide a conservative estimate.

Preferably, when the server 300/400 responds to a client request with an 'As-Of' header, and the server 300/400 has a version which is responsive (e.g., in its cache) by being valid as of the given timestamp, the server should disregard newer versions. For example if an 'If-Modified-Since' header is present in the request, then the server 300/400 may respond with HTTP status 304 'Not Modified', and instead advertise the newer resource with a 'Newer-As-Of' header.

'As-Of' in Requests without a Prior Data Preservation Directive (e.g., 'Preserve-As-Of' Header) in a Request A client can attempt to request a resource with an 'As-Of' a date-time without having sent a prior data preservation directive via the 'Preserve-As-Of' header, although the potential success may depend on the service offered by the server-side components. This may be particularly needed for third-party "CDN sites" that serve common web resources such as popular Javascript libraries; i.e. they should be able to respond with older versions.

In some embodiments, however, the client's request can be fulfilled by the server 300/400 due to a snapshot captured in response to another client's data preservation directive. That is, assuming that the resource is not private, the server-side data preserved for one client may be used to service a second client's 'as-of' requests. In addition, the server 300/400 may periodically invoke (e.g., once an hour) the server-side data capture process, regardless of client requests or data preservation directives. In yet a further embodiment, a client's data preservation directive may cause the server to extend or otherwise alter the data retention time period for server-side data already captured (e.g., through the periodic snapshot process).

In yet other embodiments, the server 300/400 may advertise or provide to clients the versions available of the preserved data. This enables a client to select a given date-time corresponding to a set of preserved data and send an appropriate 'As-Of' attribute in its request.

Reverse Serve-Stale

It is known in the art by others for a proxy server (such as 400) to provide a "serve-stale" feature, which is a configuration that instructs the proxy server to serve an older resource from the cache than the normal caching rules would permit, if the origin server is inaccessible, and thus cannot provide a fresher copy or confirm that the current one on hand is valid.

The teachings of this document can be leveraged to enable a client to make a reverse serve-stale request. A reverse serve-stale request would indicate to the reverse proxy or web server that any prior version of the requested resource is better than no response, provided that it was originally a public copy of the resource. This could be indicated with an 'As-Of' header with a value of 'any'. The server receiving such a header provides the most recent version known, although in some cases a slightly older version may be preferred if more resources are on hand matching the same timestamp as that slightly older version, and thus a wider set of congruent resources are available and valid to serve.

Protocols

As mentioned earlier, the use of HTTP semantics in the above description is not limiting. The teachings hereof may be implemented using any protocol, including HTTP/1.1, HTTP/2, and HTTP/3, the standards for Hypertext Transport Protocol. When using GRPC as a protocol, this method may be used in the singular request-response paradigm, and also for a request that yields multiple responses, provided that the first and subsequent response are the ones that would have been provided at the given timestamp, and are presented in the same order; how to end such a stream of responses is implementation-dependent.

Certificates & Authentication/Authorization

Client Access Certificates and Transport Layer Security (TLS) Certificates should not be used if expired or invalid. The headers described above do not necessarily change or affect the negotiation of encryption, authentication, or authorization. If user authentication or authorization is handled at Layer 7, it can continue to be done as is known in the art.

Manifest of Available Resources By Version/Date-Time

In some embodiments, it may be useful for the client to be able to request a manifest showing what time-stamps of resources are available (i.e, based on the time-stamped sets of underlying server-side data). This requires a system which is not only passively arranging for resources to be preserved, but also actively able to rapidly present a list of it.

OPERATIONAL EXAMPLES

This section provides examples of system operation in accord with the teachings above. No aspect of the following examples is limiting. Rather they are provided to illustrate possible implementations of the teachings above in the context of specific use cases.

First Example: Templated HTML from a Filesystem

Humans in a spacecraft far from Earth wish to access an Earth-based web site to review medical information about medication on hand. They do not wish changes to the web page structure to affect their ability to browse for a single session or to cause broken links. They do not know all the pages they will request as the research unfolds.

Let us call the human using the browser USER. Let us call the fictitious website MED. Assume that there is a communications infrastructure in place such that USER may communicate with MED using HTTP(S). Suitable link technology can include a stateless transport layer with forward error correction to address, e.g., dropped packets and long latency, although a modified TCP/IP stack might be used in some cases. Assume further that MED has origin infrastructure in New York City, where that infrastructure also has a reverse proxy and a web server, colocated. The web server is running the Linux operating system and has a large collection of HTML pages and related files under a directory /srv/web which is configured as a btrfs filesystem, a feature of the Linux kernel.

Initiating the research, USER sends a request for MED home page (path /) in local web browser software on the spacecraft. An HTTP request is sent from USER to MED by way of the communications infrastructure. This request is augmented by the browser (in accord with the teachings hereof) with the following HTTP header:

Preserve-As-Of: site now 60

The semantic meaning of the header is that server should preserve the whole site as of receive-time of the header with a tolerance for existing snapshot service that was made in the past 60 seconds of receive-time at server of the header.

MED's reverse proxy receives the request. The reverse proxy notes the header and bypasses its local cache, instead passing the request back to the web server so that the header will serve as a preservation signal to the application logic on the web server.

In this particular origin, the web server implements preservation requests by creating read-only btrfs snapshots of the/srv/web filesystem. The web server's application logic passes the snapshot request to a snapshot manager daemon using a message over Unix sockets.

In response to the snapshot request, the snapshot manager daemon executes the following steps, with respect to read-only snapshots of the filesystem /srv/web:

1. Checks if a snapshot has just been made in the last 60 seconds, which was the tolerance specified by the client which is acceptable to local policy; if so, that snapshot may be reused for this client and the remaining tasks in this list skipped. The daemon can retrieve a list of snapshots by checking the directory contents of /srv/snapshots that match the format used (see below) for its naming.
2. Checks to see if any snapshots are older than local retention policy which is hours and if any exist it takes a moment to remove up to 4 of them before proceeding (4 being a configured local policy maximum to avoid too much of a delay). (This may be accomplished alternatively by a separate thread that takes it out of line from the request flow.)
3. Verifies that there are not too many snapshots on the server or too many being requested recently as denial-of-service governance checks. (It will deny the request if either is true, and that would cause the client's preservation request to fail.)
4. It then creates a new snapshot of/srv/web as requested on the system by spawning out to a local command "btrfs-helper subvolume snapshot/srv/web/srv/.snapshots/web-2022-12-15-13-46-00". The "btrfs-helper" command is a local wrapper for the btrfs command that is setuid root and does privilege escalation for the daemon's user, after first checking that the command provided matches an allow-list of acceptable commands. The date-time shown is an example of how this daemon formats the names of the snapshots, and represents the current server time (in UTC). (The removal of snapshots as above would use similar btrfs subcommands.)
5. The daemon returns a success message.

The web server provides an HTTP response to the reverse proxy at MED that contains the header:

As-Of: Thu, 15 Dec. 2022 13:46:00 GMT

The response is constructed by the application logic in the conventional way; however the application opens and reads files as needed under /srv/.snapshots/web-2022-12-15-13-46-00 instead of under the/srv/web directory. (If the snapshot is at some point found to be gone or non-existent, the web server simply returns the normal page with "now" instead of a date-time on the header.)

The reverse proxy caches the response, using the 'As-Of' header as part of the cache key such that a cache hit will only be made when a request comes in that contains an 'As-Of' header with the same value. The reverse proxy transmits the response from MED to the web browser of USER.

When the web browser of USER receives this header, it understands that the 'As-Of' header contains a timestamp, because no tag keyword prefixes the value. Therefore it parses the value as a timestamp and can make that information available to USER as "server snapshot time" in the user interface. The web browser at MED then allows the USER to continue downloading assets and visiting other pages on the MED site, and each request for that which is transmitted is instrumented with a header reflecting back the timestamp given by the server, e.g. as follows:

As-Of: Thu, 15 Dec. 2022 13:46:00 GMT

When the reverse proxy at MED receives such a request, it checks its cache using the cache-key logic mentioned above, and, if possible, serves from cache (such that any users for which the system coalesced to the same snapshot time may be served the same cached entries and thus reduce load). In this implementation, the reverse proxy has a local policy to limit cache time of snapshotted content to 12 hours in order to limit cache proliferation, even if the same object would be cacheable longer otherwise. The reverse proxy at MED passes any request for which it has no cached content back to the web server at MED for similar treatment as described above.

In this example, the web server at MED does not attempt to snapshot application logic. This is because the local administrators have assessed that the application logic is fairly straightforward, assembling pages from a templating language, and referencing images, and therefore any change to application logic would very likely be merely to fix bugs, or to make changes that are unimportant to the scheme described above. However, it is possible that in other embodiments some aspect or all of the application logic could be snapshotted along with that data.

Example 2: Mapping Service for Forest Firefighters

A mapping application is used by a firefighting service to locate equipment, firefighters, and fires over a wide area. The commanders reviewing the maps wish to have a feature that shows a snapshot of an area, where each map tile and information about positions of equipment, firefighters and reported fires is static, even as the map is moved around and hidden tile sectors are lazily loaded.

Due to the way that positions are polled, particularly fires, it is not always possible to track things as they move, but rather there is a periodic update and position data is captured, so it's not always possible to know that a given unit moved from one place to another per se, although a human may infer that. To duplicate force representation by using data from different moments would be undesirable.

The teachings of this application are used to accomplish the above objectives. There is not necessarily high latency involved in this example, but it is one way to accomplish the outcome desired, possibly because it could be standardized across multiple web services. As those skilled in the art will recognize, the teachings hereof may be used in similar mapping use cases, such as military mapping and force tracking/deployment, and large scale first responder management, including large-scale search and rescue.

The user of the mapping application is a user called "USER". The map service is called "MAP". MAP is an application web server ("WEB") running in multiple locations for redundancy with a high-availability key-value store service ("KV") available.

In operation, USER's app sends an HTTP request to WEB to load the visible map tiles and unit location data known to MAP. To establish a consistent view, an initialization for the map metadata is requested with the header:

Preserve-As-Of: deps now

It is a convention adopted by MAP that map tiles and unit data will be considered dependencies of the initialization by WEB, and the 'deps' keyword in the header above is referring to this relationship.

WEB employs KV, a key-value store with the enhancement to store multiple values, by regular snapshot times. A key is kept in a distributed hash table (DHT, which is implemented in a conventional manner known in the art. The value returned from this DHT is a structure that formats several sub-values by time. The time represents a data collection time given to the KV when setting a value, by another service (not described herein but conventionally implemented) that updates area information. Each time a value is updated, it is added to the value with the given timestamp. A policy to discard older timestamps and related values can also sweep the value format at that moment as well. A nightly maintenance run can also sweep all key-values to remove very old sub-values.

The updating mechanism for area information creates a batch of updated data every 30 seconds for each entire active region. Thus a mass update transpires where the data is all times-tamped as above with the same data collection time. WEB also notes the data collection time of each batch update in an internal table of available timestamps. (The table may be stored at a key in KV.)

WEB responds to the metadata request and adds an additional header:

As-Of: Thu, 15 Dec. 2022 13:46:00 GMT

The above header corresponds to the current time moved back to the last batch update in the table mentioned above. USER's app will then echo back such a header on requests to populate tiles and unit data:

As-Of: Thu, 15 Dec. 2022 13:46:00 GMT

As WEB responds with the individual assets, those responses will also have the 'As-Of' header, as well as standard Date and Age headers.

USER's application also provides the USER the ability to move 30 seconds back and forth in time with a slider, and have the map go back to show that situation. For example, if USER selects to go back in time 2 minutes (120 seconds), the following header is used to request tiles and unit data. The date-time arithmetic is done by WEB.

As-Of: Thu, 15 Dec. 2022 13:46:00 GMT −120

Note that USER's application need not request information where the Age header from a newer 'As-Of' makes the age of the information older than what the adjusted 'As-Of' date-time.

When requesting from an older batch than the current batch, for each piece of data that also has updated information, WEB may attach a response header. For example, if going back 2 minutes changes data, those responses would carry a response header to indicate that future data is present, such as:

Newer-As-Of: Thu, 15 Dec. 2022 13:46:00 GMT

WEB has been configured to avoid listing every timestamp that may be relevant on that header, but simply the most current. This may then yield an icon over map tiles that indicate that "live" information is not being displayed and the situation is known to have changed.

Example 3: Backups

Consider a data vendor offers a website with a large corpus of data that changes periodically, and when one input changes, there is a large cascade of changes throughout the data set. The data vendor has a customer who is authorized to make an entire synchronized copy of the data available by HTTP REST API from the vendor. It takes some time to crawl the entire data set and make a copy, and if the data changes during that time, it frustrates the backup attempt, since then disparate elements of data will not coordinate with each other. Much like one would make a filesystem snapshot of a local server filesystem in order to back it up, a methodology is needed to do something similar over the web. (The data vendor might be, for example, providing financial statistics and data for publicly traded companies worldwide, updated continuously. The customer can pull data, but the act of pulling data will take a while and they want it to be snapshotted so that they can compare one company's statistics to another at the same moment.)

In this example, DATA refers to data from the data provider's HTTP REST API. CRAWL refers to the customer's crawling software CRAWL.

DATA makes an API available that offers JSON responses with hyperlinks to further data. The data presentation is also heavily influenced by the current application logic. Therefore in order to provide a stable target to crawl, DATA makes available preservations that take into account both the logic and the data. CRAWL issues a request for the initial data index of interest, with this header:

Preserve-As-Of: site now

DATA receives this request and checks other headers to ensure that this request is authenticated and authorized for a paying customer, as per local policy. Assuming this is true, DATA is willing to make a preservation for 24 hours. DATA maintains a table in RAM and on disk that lists the currently-available preservations in the past 24 hours, and also triggers tear-down when a preservation is past that window of time.

DATA uses app logic housed in Kubernetes microservices, pulling data from a SQL RDBMS. In order to facilitate preservation, DATA creates a copy of the Kubernetes microservices that provide the app logic, preferably on top of a Copy on Write (CoW) based filesystem such as btrfs or zfs, because such systems are more space-efficient than some others that would spend time and storage space to duplicate data that has not yet changed in the copy. The new Kubernetes microservices are launched with names that are suffixed with snapshot information showing timestamp, etc. When serving content that has an 'As-Of' header, DATA routes the request to the Kubernetes container that is named with the appropriate timestamp that matches the header value (if present, else it's a failure).

The Kubernetes containers speak to a SQL RDBMS that supports making snapshots via SQL, as known in industry. DATA will also issue the appropriate command to make a snapshot of the SQL database at a database level (because it is very likely more efficient than at a lower level).

Having made a snapshot of both the app logic and the database, DATA can then serve responses generated upon read-only snapshots of data, also the administrators of DATA may update the current application logic without altering the logic of the extra containers serving preserved logic, by setting up new Kubernetes containers and migrating, as is known in the art for microservice-based web applications.

CRAWL will then issue 'As-Of' headers on all requests until a backup is completed, echoing back the value provided by DATA in As-Of. DATA will respond to these requests by appropriate back-end routing to get a response.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
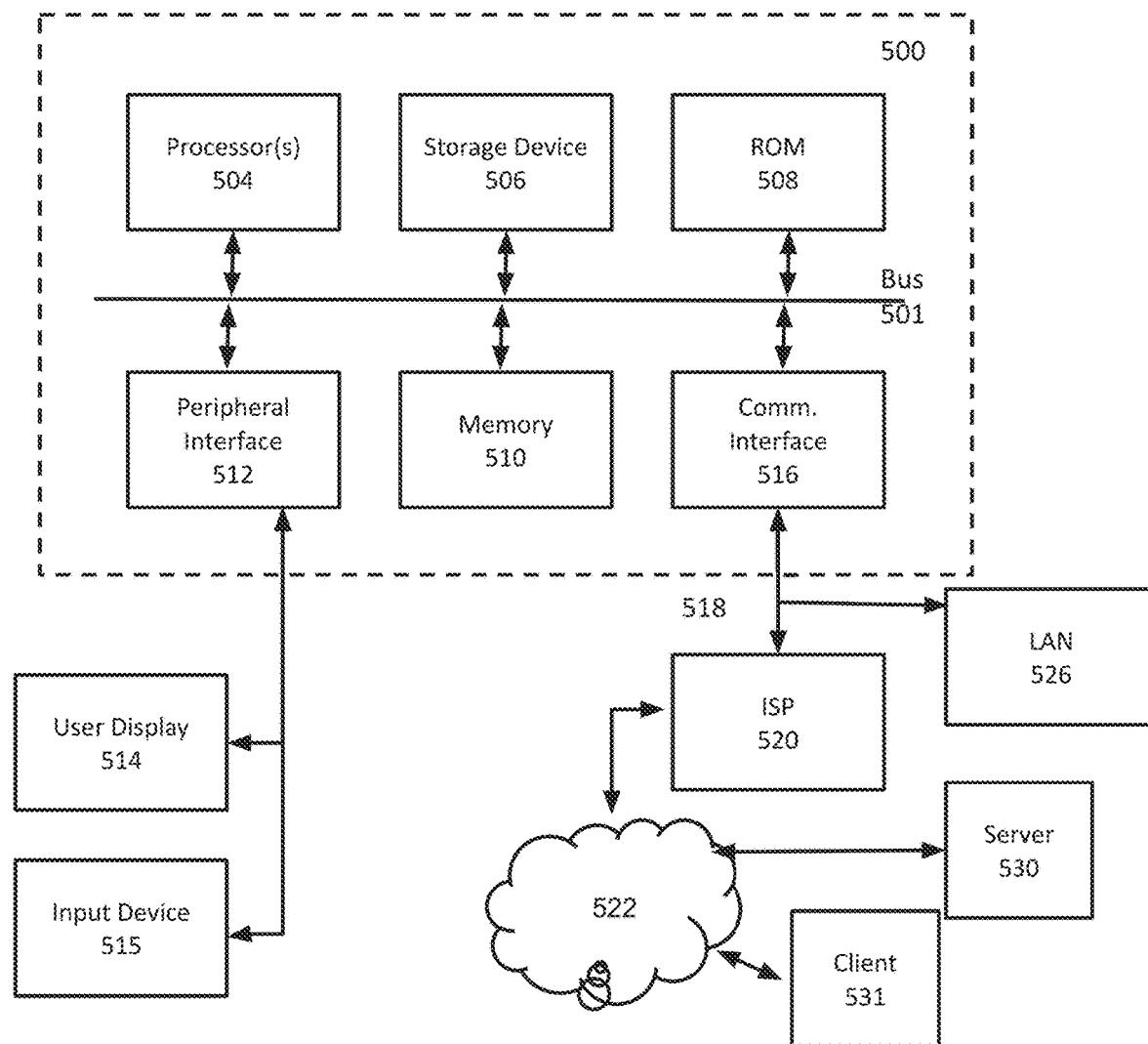

FIG. 5 is a block diagram that illustrates hardware in a computer system 500 upon which such software may run in order to implement embodiments of the invention. The computer system 500 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 500 includes a microprocessor 504 coupled to bus 501. In some systems, multiple processor and/or processor cores may be employed. Computer system 500 further includes a main memory 510, such as a random access memory (RAM) or other storage device, coupled to the bus 501 for storing information and instructions to be executed by processor 504. A read only memory (ROM) 508 is coupled to the bus 501 for storing information and instructions for processor 504. A non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

A peripheral interface 512 may be provided to communicatively couple computer system 500 to a user display 514 that displays the output of software executing on the computer system, and an input device 515 (e.g., a keyboard, mouse, trackpad, touchscreen) that communicates user input and instructions to the computer system 500. However, in many embodiments, a computer system 500 may not have a user interface beyond a network port, e.g., in the case of a server in a rack. The peripheral interface 512 may include interface circuitry, control and/or level-shifting logic for local buses such as RS-485, Universal Serial Bus (USB), IEEE 1394, or other communication links.

Computer system 500 is coupled to a communication interface 516 that provides a link (e.g., at a physical layer, data link layer,) between the system bus 501 and an external communication link. The communication interface 516 provides a network link 518. The communication interface 516 may represent an Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches. The Internet 522 should be understood in the context of this document to include wireless radio communications across vast distances, including interplanetary and space communications.

In operation, the computer system 500 may implement the functionality described herein as a result of the processor executing code. Such code may be read from or stored on a non-transitory computer-readable medium, such as memory 510, ROM 508, or storage device 506. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 518 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method, comprising:
   providing a network protocol for performing a message exchange between a client and a server, the network protocol enabling a client to send a request for a resource to the server and for the server to issue a response to the request that provides the resource; and
   activating, by at least one of (i) the client and (ii) the server, a second mode of operating the network protocol that is distinct from a first mode of operation of the network protocol, the second mode being activated to replace the first mode based on a comparison of client to server communication latency relative to a rate of server-side data updates, so as to address a risk that the server-side data changes between server responses to the client, the server-side data comprising information that is used by the server to provide the resource to the client via the network protocol.

2. The method of claim 1, wherein the second mode ensures that the server-side data remains consistent across a plurality of requests from the client.

3. The method of claim 1, wherein the second mode enables the client to direct the server to preserve a version of server-side data.

4. The method of claim 1, wherein the second mode enables the client to request a version of server-side data as of when the client issued other requests to the server.

5. The method of claim 1, wherein the network protocol comprises Hypertext Transfer Protocol (HTTP).

6. A system, comprising:
   one or more computers having circuitry forming one or more or processors and memory storing computer program instructions for execution on the one or more processors to cause the one or more computers to:
   provide a network protocol for performing a message exchange between a client and a server, the network protocol enabling a client to send a request for a resource to the server and for the server to issue a response to the request that provides the resource; and
   activate a second mode of operating the network protocol that is distinct from a first mode of operation of the network protocol, the second mode being activated to replace the first mode based on a comparison of client to server latency relative to a rate of server-side data updates, so as to address a risk that the server-side data changes between server responses to the client, the server side data comprising information that is used by the server to provide the resource to the client via the network protocol.

7. The system of claim 6, wherein the second mode enables the client to direct the server to preserve a version of server-side data.

8. The system of claim 6, wherein the second mode enables the client to request a version of server-side data as of when the client issued other requests to the server.

9. The system of claim 6, wherein the network protocol comprises Hypertext Transfer Protocol (HTTP).

10. A non-transitory computer readable medium holding program instructions for execution on one or more hardware processors to cause a server and a client to operate as follows:
   provide a network protocol for performing a message exchange between a client and a server, the network protocol enabling a client to send a request for a resource to the server and for the server to issue a response to the request that provides the resource; and
   activate a second mode of operating the network protocol that is distinct from a first mode of operation of the network protocol, the second mode being activated to replace the first mode based on a comparison of client to server communication latency relative to a rate of server-side data updates, so as to address a risk that the server-side data changes between server responses to the client, the server side data comprising information that is used by the server to provide the resource to the client via the network protocol.

11. The non-transitory computer readable medium of claim 10, wherein the second mode ensures that the server-side data remains consistent across a plurality of requests from the client.

12. The non-transitory computer readable medium of claim 10, wherein the second mode ensures that the server-side data remains consistent across a plurality of requests from the client.

13. The non-transitory computer readable medium of claim 10, wherein the second mode enables the client to direct the server to preserve a version of server-side data.

14. The non-transitory computer readable medium of claim 10, wherein the second mode enables the client to request a version of server-side data as of when the client issued other requests to the server.

15. The non-transitory computer readable medium of claim 10, wherein the network protocol comprises Hypertext Transfer Protocol (HTTP).

* * * * *